United States Patent [19]

Nussbaumer

[11] 3,975,133

[45] Aug. 17, 1976

[54] CLOSURE MECHANISM FOR AN INJECTION MOLDING MACHINE OR EXTRUSION PRESS

[75] Inventor: Thomas Nussbaumer, Zug, Switzerland

[73] Assignee: Patent & Inventions Ltd., Zug, Switzerland

[22] Filed: Dec. 23, 1974

[21] Appl. No.: 535,846

[30] Foreign Application Priority Data
Jan. 4, 1974 France .......................... 74.00226

[52] U.S. Cl. .................... 425/451.2; 425/DIG. 223
[51] Int. Cl.² ........................................... B29F 1/06
[58] Field of Search ............. 425/192, 451.2, 451.7, 425/DIG. 221, DIG. 223; 164/341

[56] References Cited
UNITED STATES PATENTS

| | | | |
|---|---|---|---|
| 2,689,978 | 9/1954 | Roger | 425/451.2 |
| 3,093,863 | 6/1963 | Ehlert | 425/451.2 |
| 3,120,039 | 2/1964 | Stubbe et al. | 425/DIG. 223 |
| 3,433,290 | 3/1969 | Eggenberger et al.. | 425/DIG. 223 X |
| 3,669,599 | 6/1972 | Snider et al. | 425/451.2 X |

OTHER PUBLICATIONS
Koerhring HPM Division Bulletin 7101.

Primary Examiner—F.S. Husar
Assistant Examiner—David S. Safran
Attorney, Agent, or Firm—Werner W. Kleeman

[57] ABSTRACT

A closure mechanism for an injection molding machine or extrusion press having a frame, a number of parallel extending rods, a first tool support fixedly connected with the frame and a second tool support displaceable along said rods. There is also provided a hydraulic mechanism or device for displacing the second tool support along the rods. According to the invention the rods possess engaging means and the second tool support possesses engaging elements which can be engaged in the engaging means of the rods. The rods are displaceably connected with the first tool support and the hydraulic device possesses at least one displacement mechanism serving to displace the second tool support with respect to the rods and for each rod possesses an additional displacement mechanism fixedly connected with the first tool support which serves to displace the relevant rod with respect to the first tool support.

3 Claims, 3 Drawing Figures

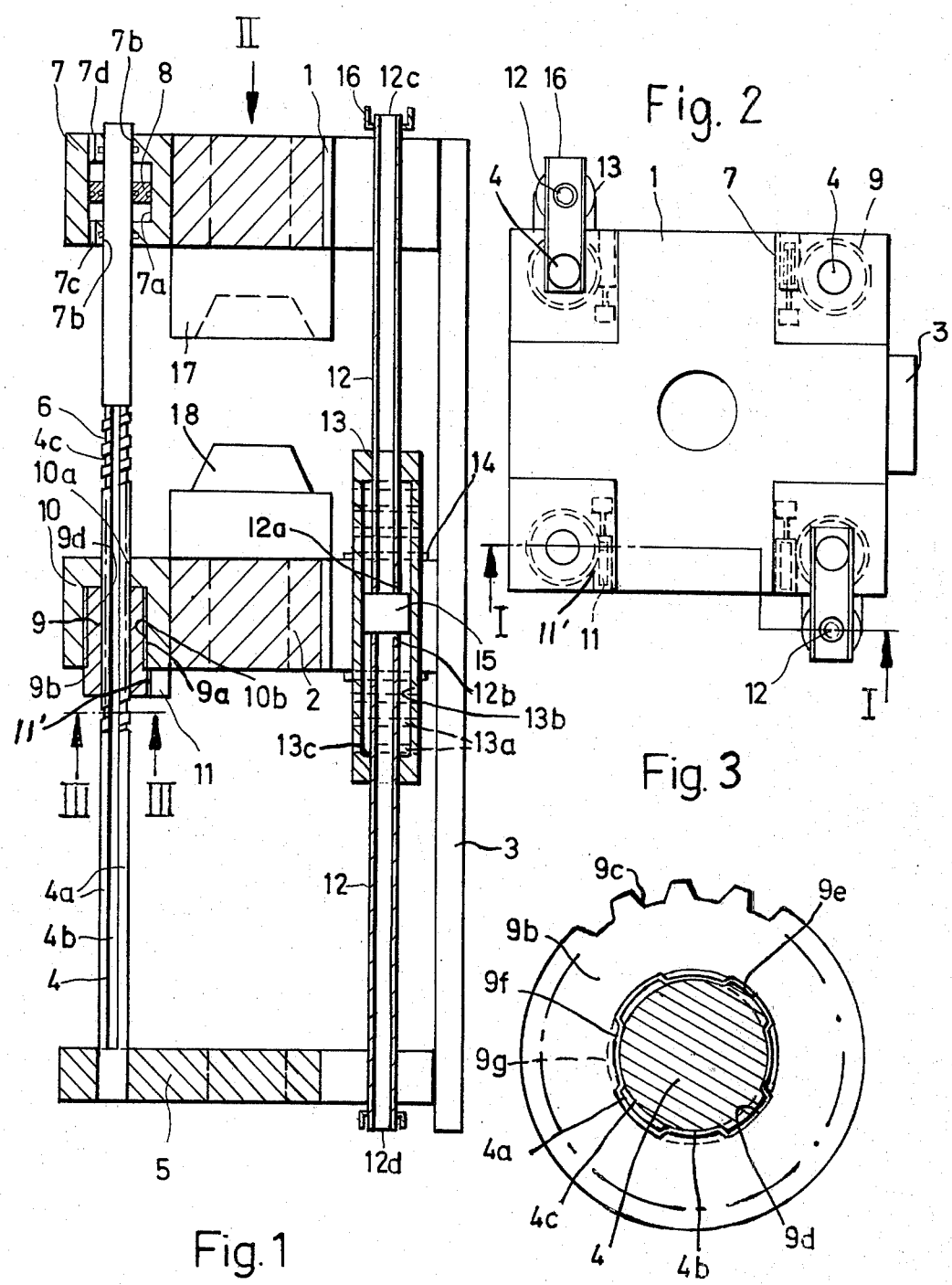

CLOSURE MECHANISM FOR AN INJECTION MOLDING MACHINE OR EXTRUSION PRESS

BACKGROUND OF THE INVENTION

The present invention relates to a new and improved closure mechanism or device for an injection molding machine or extrusion press.

Injection molding machines and extrusion presses for the fabrication of plastic parts or parts formed of light metals possess a closure mechanism incorporating a stationary tool support and a displaceable tool support. At each of both tool supports there is clamped or otherwise affixed a respective part of the molding tool or mold. During the fabrication of a molded part the displaceable tool support is displaced towards the stationary tool support during a first working step, until both tool parts contact one another and the molding tool is closed. In the next working step the molding mass which is to be processed is expressed into the tool or mold. Following the pressing-in of the molding mass is a cooling step or phase during which time the molding mass or compound solidifies. Thereafter the displaceable tool support is again moved away from the fixed tool support and the molding tool or mold is thus opened, so that the fabricated molded part can be ejected.

With prior art closure devices the non-displaceable tool support was rigidly connected with a number of rods which are in parallelism with one another, the so-called press struts or columns, along which there can be displaced the displaceable tool support or carrier. The latter is connected with the piston of a hydraulic cylinder.

In order to maintain the molding tool closed during the pressing-in of the molding mass the piston must transmit a very large force to the displaceable tool support. This force can amount to approximately 1 million kiloponds or more for machines of average size. Due to the play of the movable elements or due to small deformations there can be brought about canting and binding, by virtue of which the press struts are subjected to large forces. These forces can become so great that the press struts are destroyed.

A further drawback of the state-of-the-art closure mechanisms resides in the fact that for the attachment of the hydraulic cylinder at the side of the displaceable tool support, and which side faces away from the stationary tool support, there is required a special carrier or support. This has a result that the press struts must be very long in order to realize a satisfactory stroke. Consequently, the closure mechanism becomes very large and expensive.

SUMMARY OF THE INVENTION

Hence, it is a primary object of the present invention to provide an improved construction of closure mechanism for an injection molding machine or extrustion press which is not associated with the aforementioned drawbacks and limitations of the prior art proposals.

Now in order to implement this object and others which will become more readily apparent as the description proceeds, there is provided according to the invention a closure mechanism for an injection molding machine or extrusion press equipped with a frame, a number of rods which are arranged in parallelism with one another, a first tool support which is fixedly connected with the frame and a second tool support which is displaceable along the rods. A hydraulic mechanism serves to displace the second tool support along the rods. According to the invention the rods possess engaging or locking means and the second tool support possesses engaging or locking elements which can be engaged with the engaging or locking means of the rods. The rods are displaceably connected with the first tool support and the hydraulic mechanism possesses at least one displacement device or mechanism serving to displace the second tool support with respect to the rods and for each rod exhibits an additional displacement mechanism fixedly connected with the first tool support and which serves the purpose of displacing the relevant or associated rod with respect to the first tool support.

BRIEF DESCRIPTION OF THE DRAWING

The invention will be better understood and objects other than those set forth above, will become apparent when consideration is given to the following detailed description thereof. Such description makes reference to the annexed drawing wherein:

FIG. 1 is a longitudinal sectional view through a preferred embodiment of closure mechanism, taken substantially along the line I—I of FIG. 2;

FIG. 2 is a view of the closure mechanism shown in FIG. 1 looking in the direction of the arrow II; and FIG. 3 is a cross-sectional view taken along the line III—III of FIG. 1 and on an enlarged scale.

DETAILED DESCRIPTION OF THE PREFERRED EMBODIMENTS

Describing now the drawing, the closure mechanism or device illustrated by way of example in FIGS. 1 and 2 possesses a first stationary tool support or carrier 1 rigidly connected with the slide rail 3 of the machine frame and a second displaceable tool support or carrier 2. In this regard it is mentioned that for reasons regarding saving in space the closure mechanism of FIG. 1 has been illustrated such that both tool supports 1 and 2 are arranged above one another and that the tool support 2 can be displaced in vertical direction. However, in reality the closure devices or mechanisms of injection molding machines are normally so constructed and arranged that the displaceable tool support 2 can be displaced in horizontal direction and the slide rail 3 bears upon the ground. The displaceable tool support 2 is displaceably supported by not particularly illustrated but conventional slide shoes on the slide rail 3. At the side of the tool support 2 facing away from the tool support 1 the closure mechanism possesses a reinforcement 5 or equivalent structure. Both of the tool supports 1, 2 and the reinforcement member or reinforcement 5 are interconnected by four rods or bars 4 which are essentially in parallelism wth one another. As far as the arrangement thereof is concerned such corresponds to the press struts of the heretofore known closure mechanisms and, as will be more fully explained hereinafter, serve to guide and during certain operational phases to displace the tool support 2.

The four rods 4, of which in FIG. 3 one has been shown in sectional view on an enlarged scale, possess four lengthwise extending ribs 4a uniformly distributed about the periphery of the associated rod and therebetween a respective lengthwise extending groove 4b. At one section of the rods 4 the lengthwise extending ribs 4a are provided with grooves 4c which collectively form threading 6.

The displaceable tool support 2 possesses for each rod 4 a body member 10 rigidly connected therewith, each such body member 10 having a continuous opening 10a and of which a section 10b thereof is constructed as a threaded bore. In each of these threaded bores 10b there is arranged a sleeve 9 provided with an appropriate external threading 9a. The sleeves 9 possess a section 9b located externally of the bore 10a, and which section is provided at its outside with teeth 9c. The lengthwise extending bores 9d of the sleeves 9 and which are pierced by the rods 4 possess four respective lengthwise extending grooves 9e which bound four inwardly protruding lengthwise extending ribs 9f. The latter are equipped with grooves which collectively form an internal threading 9g which corresponds to the threading 6 of the rods 4.

As can be best seen by referring to FIG. 3 the grooves 9e are accommodated to the size of the lengthwise extending ribs 4a of the rods 4 such that the lengthwise extending ribs 4a and 9f provided with threading can be selectively brought into and out of engagement with one another. At the displaceable tool support 2 there is provided for each rod 4 a schematically illustrated displaceable hydraulic cylinder 11, the piston of which is fixedly connected with the tool support 2 and which is provided with a gear rack, generally indicated by reference character 11', which meshes with the teeth 9c of the sleeve 9. The hydraulic cylinders 11 are constructed in such a manner that the sleeves 9 can be rocked to-and-fro through one-quarter of a rotation.

The sleeves 9 and the hydraulic cylinders 11 collectively form engaging or locking devices 9, 11. The sleeves 9 serving as their engaging or locking elements can be engaged with the threading 6 serving as engaging or locking means. In this way the displaceable tool support 2 can be rigidly connected with the rods 4. On the other hand, and as best seen by referring to FIG. 3 when the sleeves 9 do not engage with the threading 6 then the tool support 2 can be shifted or displaced along the rods 4. The thread-free section of the openings 10a and the lengthwise extending ribs 9f of the sleeves 9 form the guide surfaces.

Two bodies 13 are secured at the displaceable tool support 2 by means of detachable connection means 14, namely keys or wedges or equivalent structure. These bodies are provided with a number of keyways 13a distributed along their length so that they can be attached in different positions at the tool support 2. Each of the bodies or body members 13 is provided with a continuous lengthwise extending bore 13b. Such is formed by a long middle or intermediate section and two narrower terminal sections. The ring-shaped surface bounding the intermediate section at the side facing away from the first tool support 1 has been designated by reference character 13c. In the intermediate section of the lengthwise bore 13b there is arranged a displaceable piston 15. At such piston and specifically at both oppositely situated faces thereof there is secured a pipe or tube 12. Both of the tubes 12 are in alignment with one another and each of them together with one of the end sections of the lengthwise bore 13b forms a sealed sliding seat. The jacket of the pipes or tubes 12 is provided at both sides of the piston 15 with an opening 12a and 12b respectively. Each of both pipes 12 is rigidly connected at its other end by means of a support or carrier 16 with one of the rods 4. Both of the mouths or openings 12c and 12d of both pipes or tubes 12 can be operatively connected via hydraulic lines with a hydraulic control mechanism. The pipes 12 and the bodies or body members 13 thus collectively form a respective hydraulic displacement mechanism or device 12, 13. When the engaging element 9 is not engaged then the tool support 2 with both of the hydraulic displacement mechanisms 12, 13 can be displaced along the rods 4 and relative thereto.

The stationary tool support 1 possesses four body members 7 which are rigidly connected therewith. Each such body member 7 possesses a continuous lengthwise extending bore 7a, 7b with a wider intermediate section 7a and two narrower terminal or end sections 7b. Each lengthwise extending bore 7a, 7b is pierced by one of the rods 4. The terminal sections 7b together with the relevant or associated rod 4 form a respective sealed sliding seat. At both ends there opens into the intermediate bore section 7a a respective throughpassage or bore 7c and 7d. These two throughpassages 7c, 7d can be connected via lines or conduits with a hydraulic control mechanism.

Each rod 4 is fixedly connected with a ring or ring member 8 which forms a piston displaceable in the bore section 7a. Each of the hollow bodies or body members 7 together with the associated piston 8 thus form a hydraulic displacement mechanism or device 7, 8 by means of which the rod 4 connected with the associated piston 8 can be displaced in its lengthwise direction with respect to the fixed tool support. In order that the rods 4 can be displaced they must of course either be displaceably connected with the reinforcement member 5 or however the latter must be displaceable with respect to the rail 3 of the machine frame.

In FIG. 1 there are furthermore illustrated two parts or components 17, 18 of a molding tool or mold, of which the one is clamped to the tool support 1 and the other to the tool support 2.

Having now had the benefit of the foregoing discussion of the apparatus of this development the function of the heretofore described closure mechanism will now be considered in detail.

The second tool support 2 is located approximately in the position illustrated in FIG. 1 and the engaging or locking elements 9 are not in their engaged position. The pipe mouths 12d are directly connected with the supply container for the hydraulic fluid or agent and thus without pressure. Now in order to close the molding tool 17, 18 hydraulic fluid is introduced through the pipe mouths 12c into both of the pipes or tubes 12. This hydraulic fluid or agent arrives through the opening 12a in the hollow space or compartment of the body member 13 and presses such towards the first tool support 1. Consequently, the second tool support 2 is displaced along the rods 4 and relative thereto. The hollow body 13 previously was attached by means of the wedges or keys 14 at the tool support 2 in such a manner that the piston 15 bears against the ring surface 13c when the tool or mold 17, 18 is almost closed. The piston 15 thus simultaneously forms a stop or stop means which during the closing operation determines the end position of the associated body 13, that is to say, the displaceable element of the displacement mechanism 12, 13.

The spacing of the keyways 13a are either equal to the pitch of the threads or threading 6 or equal to a whole multiple thereof. The keyways 13a are furthermore positioned such and the keys 14 constructed such that the tool support 2, when the body member 13 has reached the previously mentioned terminal position, is located in a position in which the engaging or locking element 9 can be engaged or locked. The threading 9g, 6 which mesh with one another during the engaging action advantageously possess some play.

Now when the hollow body 13 has reached the previously mentioned terminal position then the engaging element 9 can be engaged by means of the hydraulic cylinder 11. As a result the displaceable tool support is rigidly connected with the four rods 4.

Now hydraulic agent is introduced through the throughpassages 7c into the bore sections 7a of the hollow bodies 7, whereas the throughpassages 7d are without pressure. As a result the rods 4 pull the tool support 2 further towards the tool support 1 to such an extent until the molding tool is completely closed. The tubes or pipes 12 rigidly connected with the rods 4 are appropriately moved along therewith.

The tool support 2 is now held under pre-bias in this position by the displacement devices 7, 8 until the molding mass has been injected into the tool or mold.

In order that the fabricated molded part can be removed from the mold tool the latter must again be opened. For this purpose initially the throughpassage 7c is connected with the hydraulic agent-supply container and the throughpassage 7d impinged with pressure. The tool support or carrier 2 is now moved away from the tool support 1 by the rods 4. This operation can be limited for instance by means of an electrical terminal switch.

Thereafter the engaging element 9 is again rocked into the position illustrated in FIG. 3 and thus brought out of engagement.

Now by means of the pipe mouths 12d hydraulic agent is introduced via the associated opening 12b into both of the hollow bodies or body members 13. Consequently, the tool support 2 is moved along the rods 4 away from the tool support 1 until there is present between both of the parts 17, 18 of the molding tool an intermediate space which is adequate to render possible the ejection of the molded part.

As previously mentioned, the above described closure mechanism can be used for injection molding machines and extrusion presses. It has the advantage that the hydraulic displacement devices 7, 8 which must exert the large closing force required during the injection of the molding mass must only exhibit a small stroke. Accordingly, such displacement devices 7, 8 must only have delivered thereto very little hydraulic agent or fluid. A further advantage of the closure mechanism of this development resides in the fact that with the displacement devices or mechanisms 12, 13 it is possible to readily carry out relatively long displacements.

Since the tool support 2 prior to the complete closing operation is in any event rigidly connected with the rods 4 and since the large forces thereafter are transmitted by traction via the rods there does not exist any danger that the tool support 2 can assume a position which is inclined with respect to the rods 4 and that the rods 4 can become overloaded due to binding.

Since the tool support 2 is adjustable with respect to the body members 13 its closed position can be readily accommodated to molding tools of different height. The length of the threading 6 of course must be dimensioned in such a way that the engaging elements 9 with all contemplated or provided tool types can engage shortly before reaching the closed position. As will be apparent from the above disclosure the hydraulic mechanism or device of the closure mechanism possesses two groups of displacement devices or mechanisms. Both of the displacement mechanisms 12, 13 only produce a relatively small force, however, possess a large stroke or displacement path. Conversely, the four displacement mechanisms or devices 7, 8 produce a large force, however exhibit only a small stroke.

Of course the closure mechanism of this development can be modified in a number of different ways. For instance, it is possible to change the number of rods 4 and the number of displacement mechanisms 12, 13.

Furthermore, the displacement mechanisms 12, 13 naturally can also be differently arranged and constructed. For instance, instead of the cylinder the piston can be connected with the displaceable tool support 2.

Moreover, the engaging or locking element 9 instead of being rocked by means of a gear rack can be rocked by a rotary piston. Further, the engaging means of the rods 4 must not of necessity be formed by threading.

While there is shown and described present preferred embodiments of the invention, it is to be distinctly understood that the invention is not limited thereto but may be otherwise variously embodied and practiced within the scope of the following claims.

What is claimed is:

1. A closure mechanism for an injection molding machine or extrusion press, comprising frame means, a number of rods extending essentially in parallelism with one another, a first tool support fixedly connected with said frame means and a second tool support displaceable along said rods, a hydraulic mechanism for displacing the second tool support along said rods, said rods being equipped with engaging means, said second tool support being provided with engaging elements which can be engaged with the engaging means of the rods, said rods being displaceably connected with the first tool support, said hydraulic mechanism comprising at least one displacement device serving to displace the second tool support with respect to the rods and for each rod an additional displacement device fixedly connected with the first tool support and serving to displace each associated rod with respect to the first tool support, each rod possessing a number of lengthwise extending ribs distributed over its periphery, said lengthwise extending ribs being provided with threading forming said engaging means, and each engaging element possesses a threaded bore pierced by one of the rods and provided with lengthwise extending grooves corresponding to the ribs of the rods.

2. The closure mechanism as defined in claim 1, wherein each displacement device serving for the displacement of the second tool support with respect to the rods is fixedly connected with an associated rod.

3. The closure mechanism as defined in claim 2, wherein each of the displacement devices serving to displace the second tool support with respect to the rods possesses a displaceable element and stop means which during the closing operation determines the end position of its displaceable element, the last-mentioned displaceable element can be connected by detachable connection means in different positions with the second tool support, and wherein said connection means are constructed and arranged in such a manner that the engaging elements can be engaged exactly in a terminal position.

* * * * *